US007902459B2

(12) United States Patent
Lehr

(10) Patent No.: US 7,902,459 B2
(45) Date of Patent: Mar. 8, 2011

(54) JUNCTION BOX COVER ASSEMBLY

(76) Inventor: Harold Lehr, Larchmont, NY (US)

(*) Notice: Subject to any disclaimer, the term of this patent is extended or adjusted under 35 U.S.C. 154(b) by 448 days.

(21) Appl. No.: 12/152,869

(22) Filed: May 16, 2008

(65) Prior Publication Data

US 2009/0283292 A1 Nov. 19, 2009

(51) Int. Cl.
*H02G 3/14* (2006.01)

(52) U.S. Cl. ............. 174/67; 174/66; 174/481; 220/241; 220/242

(58) Field of Classification Search .................. 174/480, 174/481, 50, 53, 57, 58, 491, 66, 67; 220/3.2–3.9, 220/4.02, 241, 242; 248/906, 343; 362/365, 362/368, 147, 364, 362, 145; 439/535, 536; 33/528, DIG. 10; D13/177, 156
See application file for complete search history.

(56) References Cited

U.S. PATENT DOCUMENTS

| 5,251,118 | A | 10/1993 | Budnovitch et al. |
| 5,722,208 | A | 3/1998 | Humphrey et al. |
| 6,166,329 | A * | 12/2000 | Oliver et al. ............... 174/66 |
| 6,462,278 | B1 * | 10/2002 | Vrame ............... 174/67 |
| 6,474,846 | B1 | 11/2002 | Kelmelis et al. |
| 6,608,252 | B2 * | 8/2003 | Hurley ............... 174/66 |
| 6,612,076 | B2 | 9/2003 | Jacksen |
| 6,774,304 | B1 | 8/2004 | Gretz |
| 7,271,350 | B2 * | 9/2007 | Johnson ............... 174/480 |
| 2007/0019418 | A1 | 1/2007 | Czech et al. |
| 2008/0236884 | A1 | 10/2008 | Arbel |

FOREIGN PATENT DOCUMENTS

EP 1330002 A1 7/2003

* cited by examiner

*Primary Examiner* — Angel R Estrada
(74) *Attorney, Agent, or Firm* — Abelman, Frayne & Schwab

(57) ABSTRACT

A junction box cover assembly for mounting a fixture on a wall or ceiling. The assembly includes an adapter plate for being mounted on a junction box. A patch for supporting the cover assembly on the wall or ceiling in a mounted condition is provided. The patch is adapted to rest flush against the wall or ceiling and to be covered by and embedded in a joint compound. A hub having a body is insertable through openings of the patch and the adapter plate. The assembly includes elements for securing the hub to the adapter plate and elements for securing the hub to the patch. An insert is attachable to the hub for mounting a fixture or providing a blank-up cover.

23 Claims, 4 Drawing Sheets

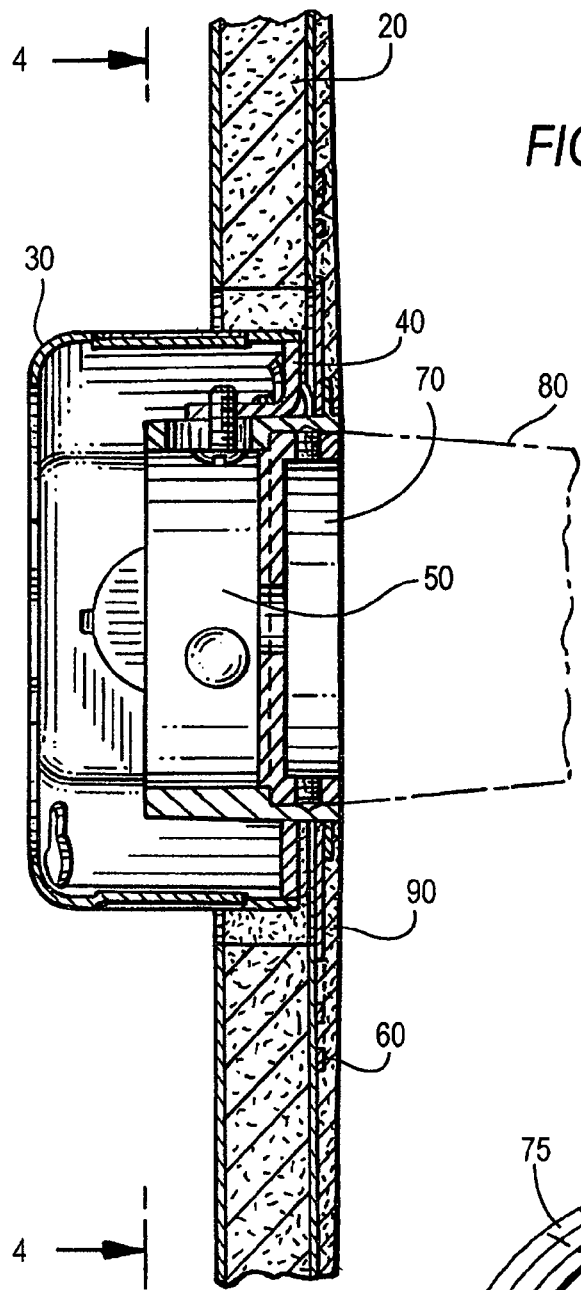
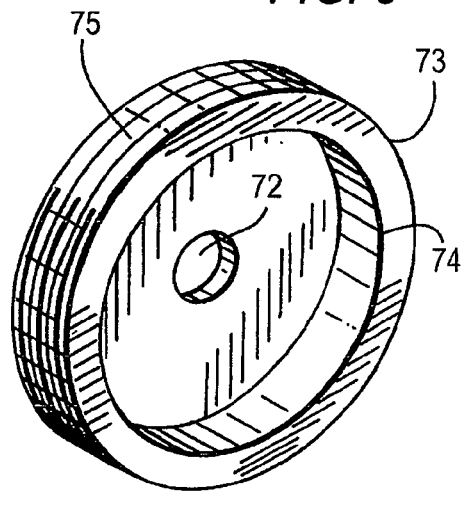
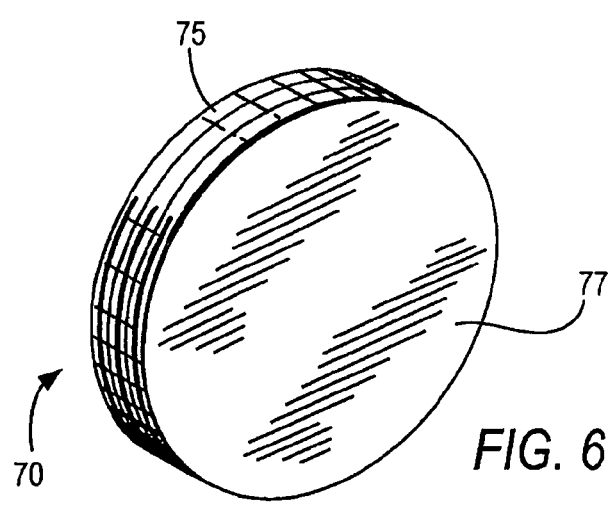

JUNCTION BOX COVER ASSEMBLY

FIELD OF THE INVENTION

The present invention relates to a junction box cover assembly for a wall or ceiling and to a method of attaching and aligning the cover assembly to a junction box while independently attaching and aligning the cover assembly to the surface of the wall or ceiling. The junction box cover assembly is used either for mounting a fixture or for providing a blank-up cover to finish the roughed-out opening surrounding the junction box.

BACKGROUND OF THE INVENTION

A junction box is a container for electrical junctions, usually intended to conceal them from sight and to some extent to eliminate tampering. It can be a small metal or plastic container, such as those intended to form part of wiring, especially in buildings. In this type of application, it may form part of an electrical conduit wiring system, or may be buried in the plaster of a wall, concealed behind an access panel or cast into concrete with only the lid showing. It may or may not include terminals, etc. for joining wires. A similar container used for joining wires to electrical switches or sockets is called a pattress. When installing an electrical component to a wall or ceiling and connecting it to the junction box, an external housing is typically required. In practice, a surface mounted canopy or the back of the fixture itself covers the roughed-out opening formed by the junction box so as to be aesthetically pleasing. There is generally no standard or specification for detailing and finishing the roughed-out area in an architectural or aesthetically pleasing manner.

U.S. Pat. No. 5,251,118 to Budnovitch et al. discloses a modular lighting system that includes a line of lighting fixtures with various body, lens, lamping system and mounting system alternative configurations, types and sizes. A cylindrical tubular extension is disclosed that extends outwardly from the junction box. The system further includes a fascia mounting plate that protrudes from the surface of the wall and surrounds the opening of the junction box.

The drawback of the known lighting system assembly consists in that the facia mounting plate protrudes from the surface of the wall and is aesthetically unsightly. In addition, the assembly does not allow an electrical component to be flush mounted without the use of a separate canopy.

Other flush mount systems of prior art workers result in surface cracking and are difficult to install.

Accordingly, an object of the present invention is to provide a cover assembly that prepares a wall- or ceiling-mounted junction box to receive a cover that can be architecturally detailed and finished and provide a mounting point for attaching fixtures, fittings and devices, and in which the drawbacks of the known modular lighting system and of the prior art are eliminated, and the assembly is aesthetically pleasing.

SUMMARY OF THE INVENTION

The above object and other advantages are achieved by the present invention which includes a junction box cover assembly for a wall or ceiling. The assembly includes an adapter plate for being mounted on a junction box and having an opening, and means for connecting the adapter plate to the junction box. The assembly further includes a patch for supporting the cover assembly on the wall or ceiling and having an opening which coincides with the opening of the adapter plate in a mounted condition of the cover assembly. The patch is adapted to mount flush against the wall or ceiling. The patch covers any roughed out openings between the wall or ceiling and the coincident openings between the adapter plate and the patch. The patch can be mounted to the wall or ceiling with joint compound and/or mechanical fasteners. A hub having a body is insertable through the openings of the patch and the adapter plate. The body can be cylindrical, rectangular, or any other shape. The upper surface of the hub or patch can include a screed edge. The assembly includes means for securing the hub to the adapter plate. The assembly includes means for securing the hub to the patch. In one embodiment, an outer portion of the body can form a projecting radially outwardly outer rim for securing the hub to the patch. An insert is attachable to the hub. The hub can have a recess portion that defines an inner lip for receiving the insert.

According to the invention, the connecting means includes at least one aperture for receiving an attachment member that secures the adapter plate to the junction box. The securing means includes at least one ear attached to an inner edge defined by the opening of the adapter plate and having a threaded opening, and the hub body has at least one opening that coincides in the mounted condition of the cover assembly with a threaded opening of the at least one ear for receiving a thread fastener that secures the hub to the adapter plate.

The insert can have an aperture for passing electrical wires. Alternatively, the insert can have a continuous surface that forms a blank-up cover. In one embodiment, the insert can be used for masking, sealing and protecting the hub recess during construction, installation, and/or finishing. The insert can be removably attached to the hub with set screws, with a threaded connection, with a snap fit, or other means of connection. In an alternative embodiment, the patch is integrally connected with the hub to form a single unitary piece.

The inventive method includes providing the cover assembly as described herein, connecting the junction box adapter plate to the junction box, inserting the body of the hub through the opening of the patch and then through the opening of the junction box adapter plate, securing the hub to the junction box adapter plate, applying joint compound to the patch and screed, and mounting the insert to the hub.

BRIEF DESCRIPTION OF THE DRAWINGS

The novel features of the present invention, which are considered as characteristic for the invention, are set forth in the appended claims. The invention itself, however, both to its construction and its mode of operation, together with additional advantages and objects, will be best understood from the following detailed description of the preferred embodiments, when read with reference to the accompanying drawings.

FIG. 3 is a partial cross-sectional view of the junction box cover assembly of FIG. 2 taken along line 3-3;

FIG. 5 is a perspective view of the hub insert according to an alternative embodiment; and FIG. 6 is a perspective view of the hub insert according to another alternative embodiment.

To facilitate understanding of the invention, identical reference numerals have been used, when appropriate, to designate the same or similar elements that are common to the figures. Further, unless stated otherwise, the figures are not drawn to scale, but are shown for illustrative purposes only.

DETAILED DESCRIPTION OF THE INVENTION

Figure 1:
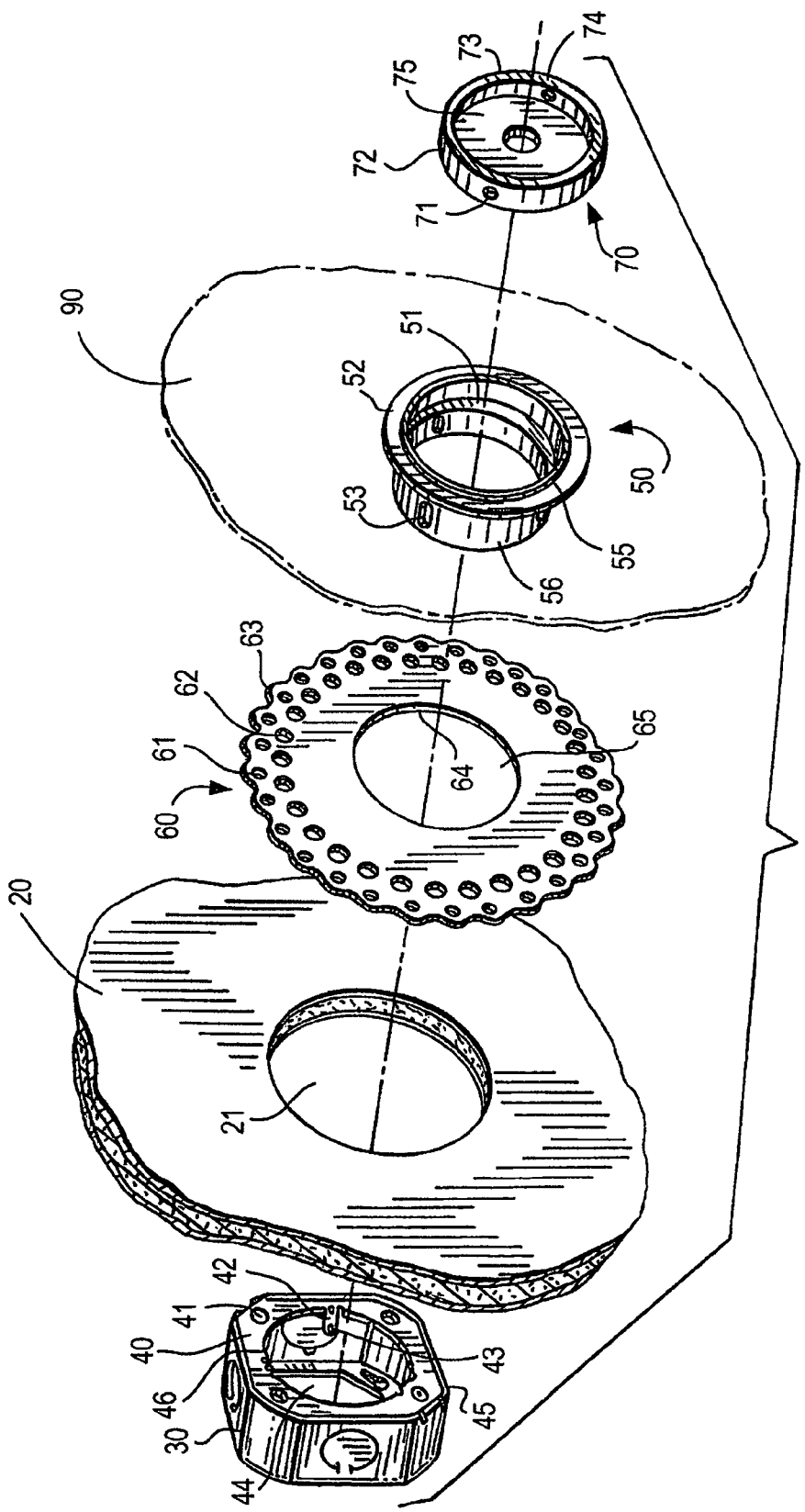
FIG. 1 is an exploded perspective view of the junction box cover assembly of the present invention.

FIG. 1 illustrates an exploded perspective view of the junction box cover assembly of the present invention. The junction box cover assembly is adapted for mounting a fixture (see FIG. 2) on a wall or ceiling. As used herein, the term "fixture" means any of the following: wall lamps, pendants, surface mounted track, monopoints, communication jacks, sensors and detectors, blank-up covers, and custom box openings and mountings, fittings, and devices. As used herein, terms "wall" and "ceiling" mean a structurally supported surface, usually of a material such as gypsum board, but also can be wood, plaster, cementitious, metal, etc., that is a part of a building's construction. As described hereinbelow, the junction box cover assembly has several component parts.

An adapter plate 40 is mounted on a junction box 30. The adapter plate 40 has an opening 44 which is defined by an inner edge 46. The outer edge 45 of the adapter plate 40 preferably coincides with the size and shape of the junction box 30. That is, the shape of the adapter plate 40 is unique for each junction box style. The adapter plate 40 comprises at least one aperture 41 for receiving an attachment member (not shown) that secures the adapter plate 40 to the junction box 30. In one embodiment, the adapter plate 40 includes at least one ear 42 attached to an inner edge 46 defined by the opening 44, and the ear 42 has a threaded opening 43.

The present invention is adapted for use with commonly known junction boxes. For example, the National Electric Code (NEC) requires that "Boxes and conduit bodies shall be installed so that the wiring contained in them can be rendered accessible without removing any part of the building . . . " This includes drywall or any other finished surface. This Code provision is what defines and limits the present state of the art. As used herein, the term "junction box" refers to any of the following: a 4 inch octagon box, 4 inch square junction box, 4 inch—2 device box, 4 inch round ceiling pan, 2×4 handy box, 1 device switch box/gem box, 2 device switch box/gem box, 4 11/16 inch square box/plenum box, and any other special or custom constructed boxes. The present assembly is adapted for use with a junction box 40 which has already been mounted in a roughed out opening in a wall or ceiling in a typical manner. The junction box can be brand new or can be pre-existing in the wall or ceiling.

A patch 60 is provided for supporting the cover assembly on the wall or ceiling and also for covering open areas between the junction box and the surrounding ceiling/wall. The patch 60 has an opening 65 that coincides with the opening 44 of the adapter plate 40. The opening 65 is defined by an inner edge 64. The patch 60 is adapted to rest flush against the gypsum board 20 and to be embedded and covered by a joint compound 90. As used herein, the term "joint compound" means any material used for providing a surfacing, leveling, patching, adhesive and/or finishing layer in construction, such as epoxy, plastic, plaster, etc., each of which has its own characteristics that make it suitable for a particular application. The joint compound 90 can cover the entire surface of the patch 60 and the gypsum board 20 immediately surrounding it, thereby resulting in a substantially flush finish. In another embodiment, mechanical fasteners can be used to secure the patch to the wall or ceiling. The patch 60 can include a plurality of apertures 61, 62 of various sizes and shapes to provide an enhanced surface for receiving the joint compound 90. Further, the plurality of apertures 61, 62 can offer an enhanced aesthetic appeal for the assembly kit. The outer edge 63 of the patch 60 can be jagged or smooth. The patch 60 can be any size and shape. Preferably, the patch 60 has a relatively thin cross-section in order to maintain a substantially flush finish after the application of the joint compound 90. The patch 60 is able to be modified by cutting off certain outer portions with hand tools in the field to fit various installation requirements. The patch 60 can further include clearance holes for receiving screws used for mounting the adapter plate 40 in a flush condition. If these clearance holes are present on the patch 60 they should be taped off prior to applying the joint compound 90.

A hub 50 includes a body 56 that is insertable through the openings 65, 21 of the patch and the adapter plate. Preferably, the cross-section of the body 56 is about equal to the cross-section of the openings 65, 21 of the patch and the adapter plate, resulting in a close-fitting relation. Although shown as a cylindrical body, the hub can be formed as a rectangular body or any other shape. An outer portion of the cylindrical body can form a projecting radially outwardly outer rim 52 for securing the hub to the patch 60. The cylindrical body 56 includes at least one aperture 53 that coincides with the threaded opening 43 of the at least one ear 42 for receiving a thread fastener (see FIG. 4). The thread fastener can therefore be used to secure the hub 50 to the adapter plate 40. In one embodiment, the threaded opening 53 is elongated to allow for adjustable mounting. The hub can have a recess portion that defines an inner lip 51. Preferably, the upper surface of the hub or patch includes a screed edge 55 in order to strike off against when leveling and applying the joint compound 90.

An insert 70 is attachable to the hub 50. The insert 70 can be used for mounting a fixture (see FIG. 2) on the wall or ceiling. The insert 70 is attached within the hub 50 and rests against the inner lip 51, if present. The outer edge 73 of the insert 70 is in a tight-fitting relation to the recess portion of the hub 50. The insert 70 can include apertures 71 for receiving set screws (not shown) for attachment. The insert 70 includes an aperture 72 for passing electrical wires (not shown). The insert 70 has a recessed surface 76 having an outer boundary that is defined by an inner edge 74 of the hub. Alternatively, the surface can rest flush with the upper plane of the insert 70 or can be adapted for special uses and design considerations, such as being concave to focus light. The insert 70 is removable to allow accessibility to the junction box 30.

Figure 2:
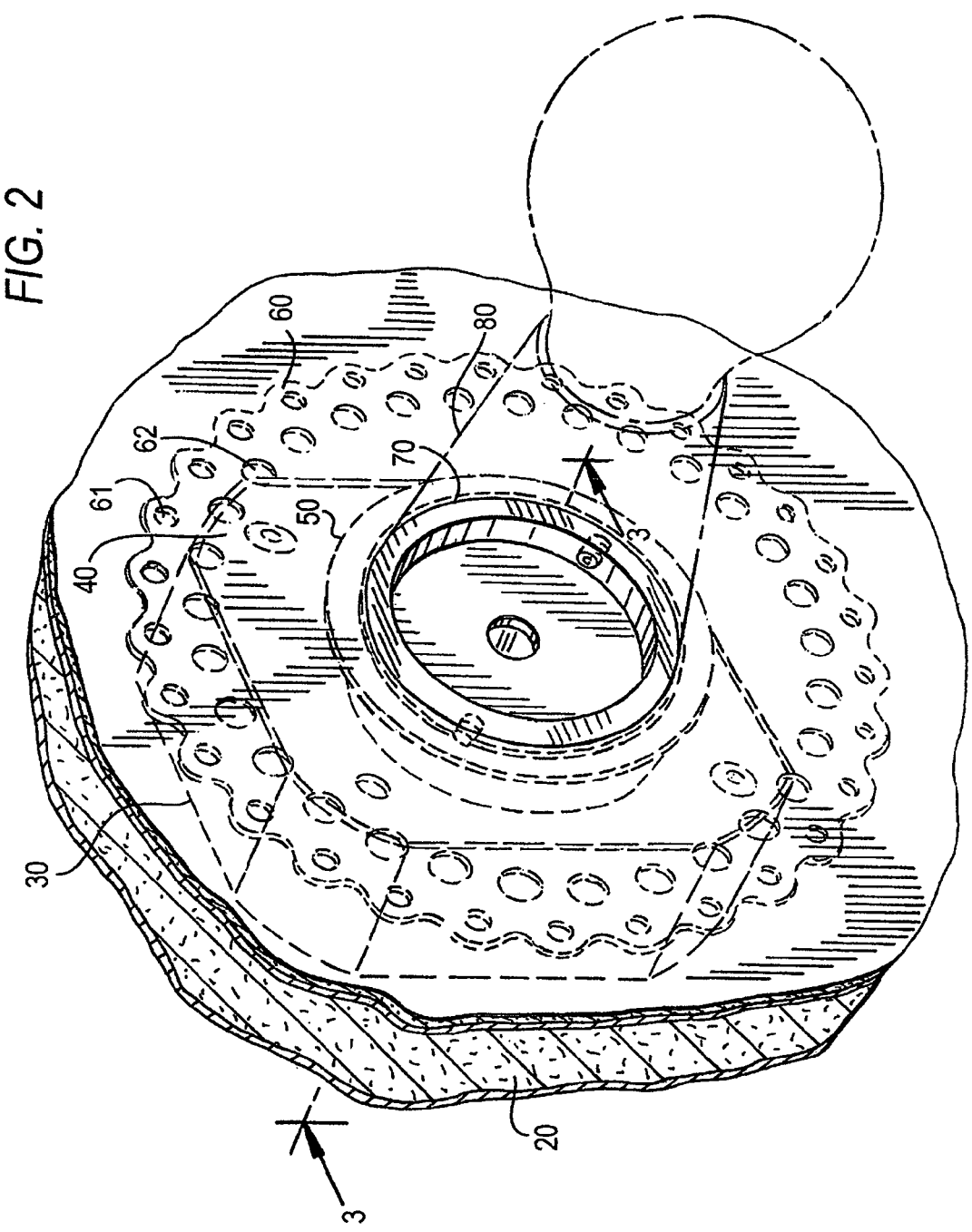
FIG. 2 is a perspective view of the junction box cover assembly of FIG. 1 in a mounted condition.

FIG. 2 is a perspective view of the junction box cover assembly of the present invention in a mounted condition. A fixture 80 is mounted to the insert 70. The assembly of the present invention allows a fixture 80 to be mounted to a wall or ceiling without the need for a canopy. The result is a flush mount assembly which is aesthetically pleasing and which allows the mounting of fixtures with smaller foot prints.

FIG. 3 is a partial cross-sectional view of the junction box cover assembly of the present invention in a mounted condition. As shown, the joint compound 90 completely covers the upper and lower surfaces of the patch 60 and provides further support for anchoring the assembly to the gypsum board 20. Other materials such as plaster, plywood, concrete, and the like can be utilized for the board 20. The fixture 80 can have any size foot print and can be larger or smaller than the size of the insert 70.

Figure 4:
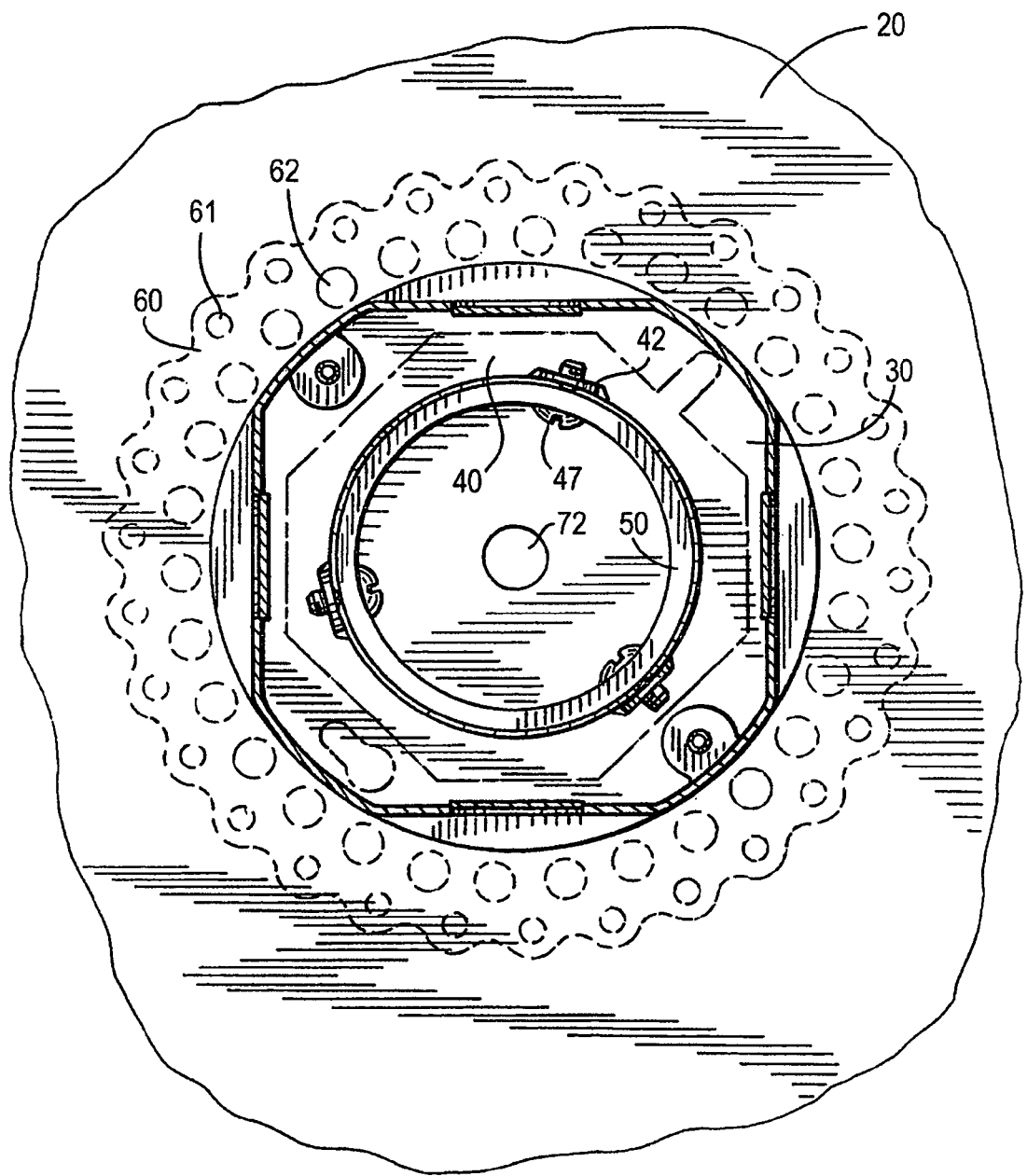
FIG. 4 is a partial cross-sectional view of the junction box cover assembly of FIG. 3 taken along line 4-4.

FIG. 4 is a partial cross-sectional view of the junction box cover assembly of FIG. 3 taken along line 4-4. Thread fasteners 47 join the ears 42 of the adapter plate to the hub 50. The aperture 72 allows electrical wires to pass through to the fixture.

FIG. 5 is a perspective view of the hub insert 70 according to an alternative embodiment. Rather than using set screws, the hub insert 70 has a threaded portion 75 that mates with a corresponding threaded portion on the hub 50 for attachment thereto. Preferably, the threaded insert 70 consists of two pieces: a threaded ring and a flat plate being retained by the threaded ring. By consisting of two pieces, the ring can be tightened down without turning the flat plate. Other means for securing the hub insert 70 to the hub 50 can be used, such as, a snap-fit, an adhesive compound, and the like. Alternatively, the insert can be integrally formed with the fixture.

FIG. 6 is a perspective view of the hub insert 70 according to another embodiment. Rather than having an aperture for passing wires, the insert 70 has a continuous surface 77 that forms a blank-up cover. The insert 70 can be attached to the hub 50 with a threaded portion 75. This embodiment can be used to finish the roughed-out opening of a junction box 30 which is not being utilized. The blank-up insert 70 can easily be removed to access the junction box 30. If the user decides to mount a fixture, the blank-up cover insert can be replaced with an insert having a central aperture and which is designed for receiving the fixture. Alternatively, the blank-up insert 70 can be used to seal and protect the recess portion of the hub 50 during construction and installation.

In an alternative embodiment, the patch 60 is integrally connected with the hub 50 to form a single unitary piece. This embodiment could simplify manufacturing and reduce costs. Further, this embodiment reduces the risk of surface cracking because of the strong mechanical connection.

The junction box cover assembly of the present invention is mounted on the junction box as follows. The junction box adapter plate 40 is connected to the junction box 30. The patch 60 is mounted to the wall or ceiling by embedding and or fastening. The body 56 of the hub 50 is inserted through the opening 65 of the patch 60 and then through the opening 44 of the junction box adapter plate 40. The hub 50 is secured to the junction box adapter plate 40. Joint compound 90 is applied to the patch 60, and the joint compound is striked off against the screed edge of the hub. The insert 70 is mounted to the hub 50.

When the present assembly is in a mounted condition, it eliminates the necessity of covering the unfinished, roughed-out opening 21 that surrounds the junction box 30 because the assembly has a smaller opening that requires no trim. In summary, the assembly of the present invention provides an architectural "covered" appearance/finish while at the same time providing the required accessibility and functionality.

The above disclosure is intended to be illustrative and not exhaustive. This description will suggest many modifications, variations, and alternatives may be made by ordinary skill in this art without departing from the scope of the invention. Those familiar with the art may recognize other equivalents to the specific embodiments described herein. Accordingly, the scope of the invention is not limited to the specific embodiments and/or details thereof, and the present invention includes all variations and/or alternative embodiments within the spirit and scope of the present invention as defined by appended claims.

What is claimed is:

1. A junction box cover assembly, comprising:
   a. an adapter plate for being mounted on a junction box and having an opening;
   b. means for connecting the adapter plate to the junction box;
   c. a patch for supporting the cover assembly on the wall or ceiling and having an opening that coincides with the opening of the adapter plate in a mounted condition of the cover assembly, the patch being adapted to be mounted flush against the wall or ceiling and to cover any roughed out openings between the wall or ceiling and coincident openings between the adapter plate and the patch;
   d. a hub having a body insertable through the openings of the patch and the adapter plate;
   e. means for securing the hub to the adapter plate, wherein the securing means comprises at least one ear attached to an inner edge defined by the opening of the adapter plate and having an opening, and the hub body has at least one opening that coincides in the mounted condition of the cover assembly with the opening of the at least one ear for receiving a thread fastener that secures the hub to the adapter plate;
   f. means for securing the hub to the patch; and
   g. an insert removably attachable to the hub.

2. A cover assembly as set forth in claim 1, wherein the means for securing the hub to the patch includes an outer portion of the body that forms a projecting radially outwardly outer rim.

3. A cover assembly as set forth in claim 1, wherein the body of the hub is cylindrical.

4. A cover assembly as set forth in claim 1, wherein the body of the hub is rectangular.

5. A cover assembly as set forth in claim 1, wherein an upper surface of the hub or patch has a screed edge for striking off joint compound.

6. A cover assembly as set forth in claim 1, wherein the patch is mounted to the wall or ceiling with an adhesive compound.

7. A cover assembly as set forth in claim 1, wherein the patch is mounted to the wall or ceiling with mechanical fasteners.

8. A cover assembly as set forth in claim 1, wherein the hub has a recess portion defining an inner lip for receiving the insert.

9. A cover assembly as set forth in claim 8, wherein the insert is removably attached and seals and protects the recess portion during construction and installation.

10. A cover assembly as set forth in claim 1, wherein the connecting means comprises at least one aperture for receiving an attachment member that secures the adapter plate to the junction box.

11. A cover assembly as set forth in claim 1, wherein the insert has an aperture for passing electrical wires.

12. A cover assembly as set forth in claim 1, wherein the insert has a continuous surface that forms a blank-up cover.

13. A cover assembly as set forth in claim 1, wherein the patch is integrally connected with the hub to form a single unitary piece.

14. A cover assembly as set forth in claim 1, further comprising a fixture mounted to the insert.

15. A cover assembly as set forth in claim 14, wherein the fixture is selected from the group consisting of: wall lamps, pendants, surface mounted track, monopoints, communication jacks, sensors and detectors, blank-up covers, and custom box openings and mountings, fittings, and devices.

16. A cover assembly as set forth in claim 14, wherein the fixture is integrally formed with the insert.

17. A cover assembly as set forth in claim 1, wherein the opening of the at least one ear is threaded.

18. A junction box cover assembly, comprising:
   a. an adapter plate for being mounted on a junction box and having an opening;
   b. means for connecting the adapter plate to the junction box;
   c. a hub having a body insertable through the opening of the adapter plate;

d. means for securing the hub to the adapter plate, wherein the securing means comprises at least one ear attached to an inner edge defined by the opening of the adapter plate and having an opening, and the hub body has at least one opening that coincides in the mounted condition of the cover assembly with the opening of the at least one ear for receiving a thread fastener that secures the hub to the adapter plate; and e. an insert removably attachable to the hub.

19. A cover assembly as set forth in claim 18, further comprising a fixture mounted to the insert.

20. A cover assembly as set forth in claim 19, wherein the fixture is selected from the group consisting of: wall lamps, pendants, surface mounted track, monopoints, communication jacks, sensors and detectors, blank-up covers, and custom box openings and mountings, fittings, and devices.

21. A cover assembly as set forth in claim 18, wherein the opening of the at least one ear is threaded.

22. A junction box cover assembly, comprising:

a. an adapter plate for being mounted on a junction box and having an opening;

b. means for connecting the adapter plate to the junction box;

c. a patch for supporting the cover assembly on the wall or ceiling and having an opening that coincides with the opening of the adapter plate in a mounted condition of the cover assembly, the patch being adapted to be mounted flush against the wall or ceiling and to cover any roughed out openings between the wall or ceiling and coincident openings between the adapter plate and the patch;

d. a hub having a body insertable through the openings of the patch and the adapter plate;

e. means for securing the hub to the adapter plate;

f. means for securing the hub to the patch;

g. an insert removably attachable to the hub; and h. screw means for removably attaching the insert to the hub.

23. A junction box cover assembly, comprising:

a. an adapter plate for being mounted on a junction box and having an opening;

b. means for connecting the adapter plate to the junction box;

c. a patch for supporting the cover assembly on the wall or ceiling and having an opening that coincides with the opening of the adapter plate in a mounted condition of the cover assembly, the patch being adapted to be mounted flush against the wall or ceiling and to cover any roughed out openings between the wall or ceiling and coincident openings between the adapter plate and the patch;

d. a hub having a body insertable through the openings of the patch and the adapter plate;

e. means for securing the hub to the adapter plate;

f. means for securing the hub to the patch;

g. an insert removably attachable to the hub; and h. threaded means for removably attaching the insert to the hub.

* * * * *